Jan. 13, 1970  L. P. CROSET  3,488,979
UNIVERSAL JOINTS
Filed May 13, 1968  3 Sheets-Sheet 1

INVENTOR
LOUIS PAUL CROSET
By Young & Thompson
ATTYS.

Jan. 13, 1970

L. P. CROSET 3,488,979

UNIVERSAL JOINTS

Filed May 13, 1968

INVENTOR
LOUIS PAUL CROSET
By Young & Thompson
ATTYS.

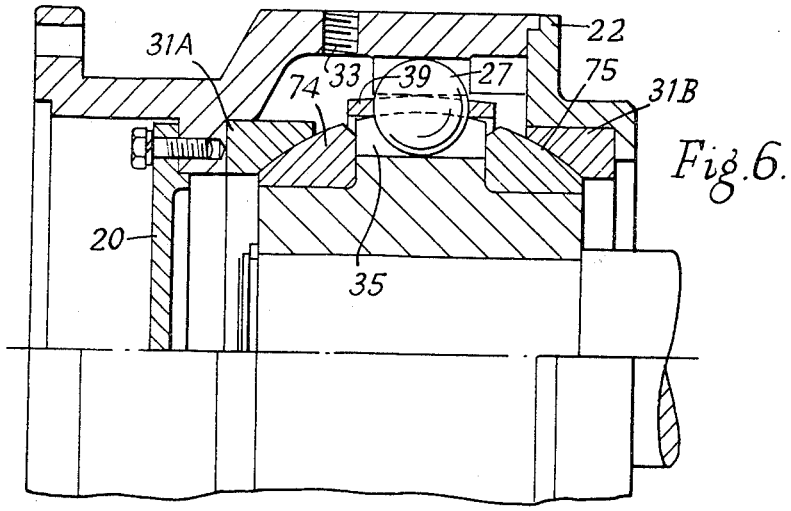
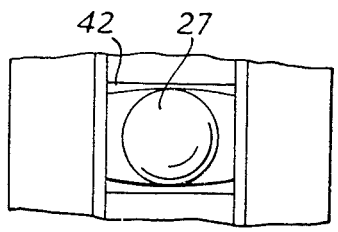
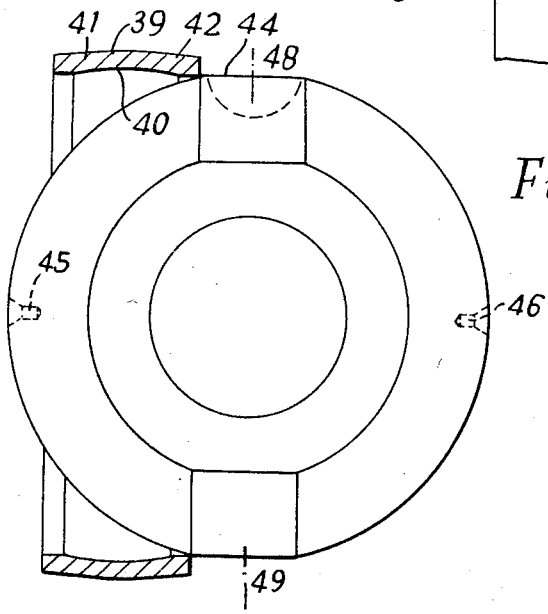

United States Patent Office 3,488,979
Patented Jan. 13, 1970

3,488,979
UNIVERSAL JOINTS
Louis Paul Croset, 23 Gernhill Ave.,
Fixby, Huddersfield, England
Filed May 13, 1968, Ser. No. 728,436
Claims priority, application Great Britain, May 30, 1967,
24,291/67
Int. Cl. F16d 3/24
U.S. Cl. 64—21       6 Claims

ABSTRACT OF THE DISCLOSURE

A universal joint has a frusto-spherical hub provided with peripherally spaced grooves in which a plurality of balls are rotatably disposed. A cage retains the balls, and the hub is machined to have an equitorial cylindrical belt to facilitate placing the cage on the hub, the median plane of the cylindrical surface containing the axis of the shaft to which the hub is connected.

---

This invention relates to torque transmitting universal self-aligning joints or couplings of the true constant angular velocity type in which the drive transmitting elements consist of a series of steel balls engaging grooves of or approximately semi-circular or so called double-flank cross-section, i.e., cross-section made up of two curves on different centres, as used in well known makes of ball bearings, provided externally in the inner joint member or hub and internally in the outer joint member or sleeve, the said grooves being parallel to the axis of rotation of the said members, the said torque transmitting elements being maintained in a true plane of rotation by a cage.

It is known that joints of this type will transmit motion uniformly between the two members provided that, when the members are in angular relation, the axis of the cable (which is normal to the plane containing the centres of the balls) bisects the angle between the axes of the members. For this purpose means must be provided for positively adjusting the cage member to the mid position (i.e., half said angle) whenever there is angular adjustment of the shafts in relation to each other and whether or not the shafts are rotating.

Accordingly, in known constructions, mechanical articulation of the ball cage is effected through one axially-disposed pilot lever or, alternatively, by means of the radially-disposed pilot levers in a plane co-incident with the axis of rotation of the hub member or in the plane of rotation of the driving balls when the hub and sleeve members are in alignment, respectively.

In order that a one-piece cage may be used it is known to make two of the ball apertures in the cage much wider than the balls, but the use of such a cage is limited to universal joints having a narrow hub member and not more than six balls. In other words, a cage with two large apertures can only be used in joints having not more than six balls with articulation of the cage being either by means of eccentric grooves or by one axially-disposed pilot lever.

The main object of the invention is an improved construction which makes it possible to assemble a one-piece ball cage over a hub member of width substantially greater than the axial length of the ball grooves, and is applicable to joints having any desired number of balls, the said construction landing itself in particular to the economical manufacture of heavy-duty universal joints.

According to the invention, the exterior spherical surface of the hub is provided with a cylindrical part, the axis of generation of which is at an angle to that of the hub (preferably at right angles to that of the hub, extending over the edges of at least one ball groove) the interior of the cage having a central spherical surface with adjacent cylindrical ends whose bore is a sliding fit over the cylindrical hub portion, whereby the cage can be slid over the said cylindrical surface of the hub and then rotated into the required plane of the ball centres, the said central spherical surface of the cage being a sliding fit over the spherical surface of the hub upon which the cage cna oscillate and maintain the balls in the true median plane at any angle of tilt, the cage having no external contact with the sleeve member, and mechanical articulation means being provided for controlling the angular position of the cage.

The hub member may be in one-piece or carry two abutment rings with frusto-spherical surfaces facing in opposite directions and engageable by abutment surfaces of similar shape carried by the sleeve member.

The joints of the present invention are provided with mechanical articulation means for controlling the angular position of the cage, preferably means of three radially-disposed pilot levers.

When articulated by means of three radially-disposed pilot levers, the circular ball cage is provided with three equally spaced apertures in a plane co-incident with the apertures provided for the balls, the said apertures forming a fulcrum for the pilot levers, corresponding sockets being provided in the hub and sleeve members. Further according to the invention, the ball cage may have ball apertures all of uniform size and shape which may be circular or slightly oblong, e.g., a length not more than 110 to 120 percent of its width.

Furthermore, according to the invention, the hub member may be provided with a central exterior frusto-spherical surface which surface and the cylindrical surface are of axial length equal to that of the ball grooves and with two abutment rings, one on each side of the grooves, of spherical diameter equal to or slightly less than that of the hub, these rings being provided with said frusto-spherical surfaces and having unbroken surfaces in contact with the spherical surfaces of the abutment rings on the sleeve member, thus precluding the flow of lubricant from the ball chamber through the cylindrical flats to each end of the hub, as obtains in the construction comprising a one-piece frusto-spherical hub.

Two constructional forms of the invention are illustrated by way of example in the accompanying diagrammatic drawings, wherein:

FIGURE 5 shows the introduction of the ball cage over the cylindrical flat of the hub, the ball grooves not being indicated;

FIGURE 6 shows a modified construction of universal joint with a hub provided with two frusto-spherical locating rings; and FIGURE 7 is a part plan of the hub of FIGURE 6, showing a ball in a groove and a cylindrical flat surface extending over the groove length only.

Figure 1:
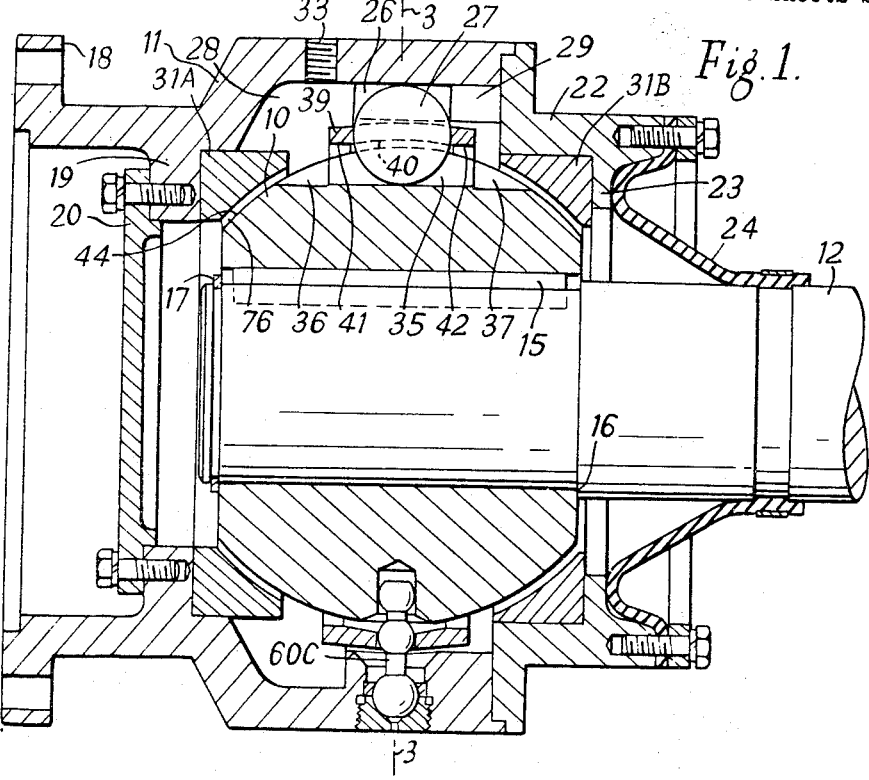
FIGURE 1 is a longitudinal section of a universal joint made in accordance with the invention.

The coupling comprises a hub member 10 located within a sleeve member 11. A shaft 12 is engaged in a bore in the hub member and attached thereto by a key 15. The shaft may alternatively be attached by involute splines or parallel sided splines for axial or so-called length compensation movement. As shown in the drawing however the hub member is held between a shoulder 16 on the shaft and a circlip 17 on the shaft.

The sleeve member has a flange 18 for bolting to a flange on another shaft (not shown).

The sleeve member has an internal flange 19 at one end to which a cover plate 20 is bolted. At the other end the sleeve member has a separable part 22 having an internal flange 23. An oil seal gaiter 24 is attached to the end part 22 and engages around the shaft 12.

The sleeve member is formed with straight grooves 26 parallel to each other to receive steel balls 27 and is formed with an inner circular recess 28 and outer groove clearance recesses 29 co-axial with each groove so that only the central or working portion of the groove requires precision grinding.

The hub member has an exterior frusto-spherical surface 30 (FIG. 2) the opposite ends of which are slidably engageable for axial location on surfaces of similar shape which face each other on abutment rings 31A, 31B carried by the sleeve member. The hub spherical surface 30 has slight working clearance in relation to the abutment surfaces of rings 31A, 31B.

An oil filling hole is closed by a plug 33 in sleeve member 11.

The hub has straight grooves 35 parallel with the axis of the shaft 12 to receive the driving balls 27 and clearance recesses 36, 37 to confine precision grinding to the centre or working portion of the groove.

A one-piece cage 39 is formed with a central inner frusto-spherical surface 40 seating slidably on the surface of the hub. Peripheral margins 41, 42 of the cage extend on either side of the central part 40 to provide adequate strength.

In order to be able to place the cage on the hub, the latter is turned down to cylindrical form 44 by rotating it on centres 45, 46 (FIG. 5) so that the median plane of the cylindrical surface contains the axis of the shaft 12, said plane being coincident with the central plane of one diametrically opposed driving ball and cage pilot lever. The width of the cylindrical surface is slightly greater than the ball diameter so as to extend slightly over the edges of a ball groove.

The cage 39 is also turned at its inner annular margins 41, 42 to a diameter about equal to that of the cylindrical surface 44 over which it is a push or sliding fit for its assembly thereon before the hub is threaded on to the shaft 12.

Figure 2:
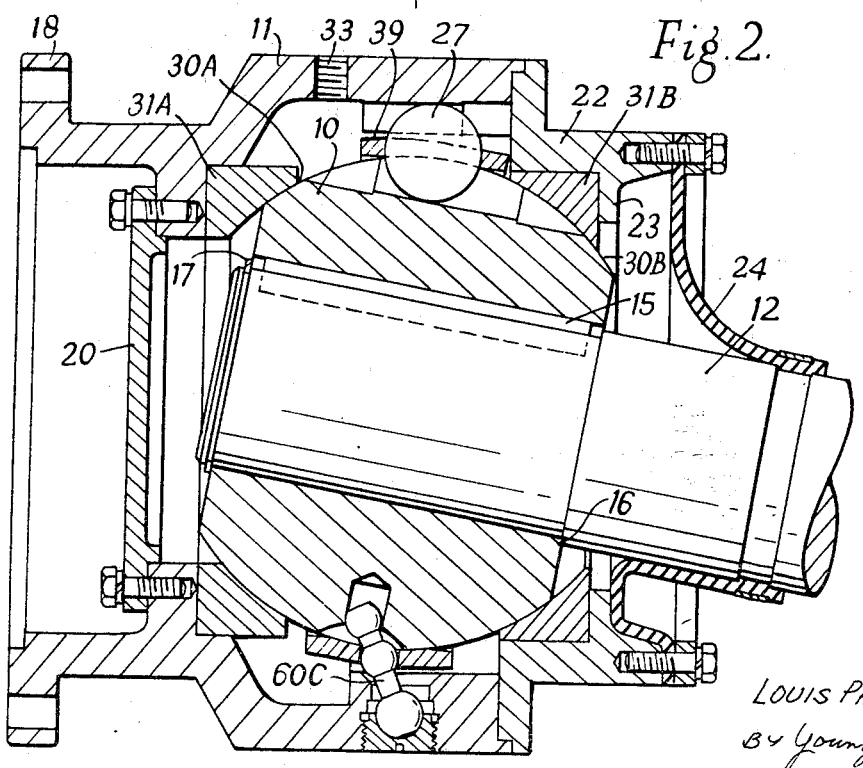
FIGURE 2 is a similar view showing the parts in a position of angular misalignment.
Figure 3:
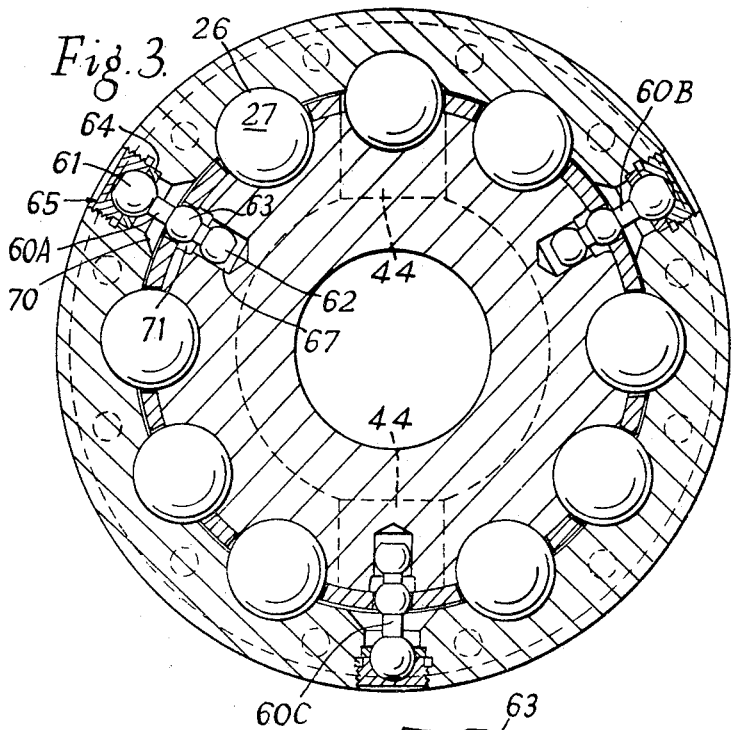
FIGURE 3 is a view in section on line 3—3 of FIGURE 1.
Figure 4:
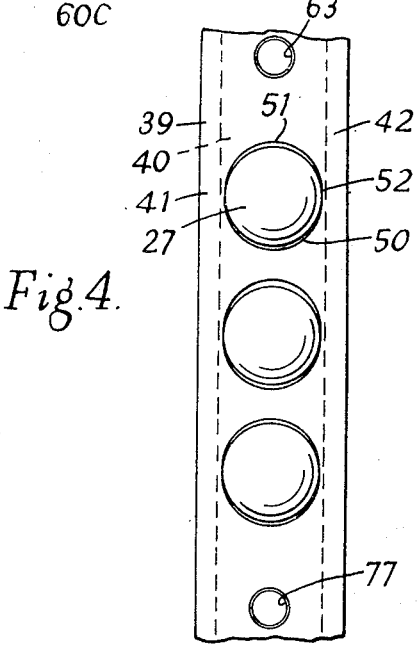
FIGURE 4 illustrates a ball cage showing the ball and pilot lever apertures in the cage.

The cage 39 is thus applied in the plane 48, 49 (FIG. 5) and then rotated about the axis also indicated by 48, 49 through 90° to bring it to the required position shown in FIGS. 1–3 when its inner spherical surface 40 is a sliding fit on the spherical surface of the hub member.

The cage has apertures 50 to receive the balls and those are shown slightly elongated in the peripheral direction but the largest size across the aperture will not exceed 110 to 120 percent of the ball diameter. These apertures have part circular portions 51 which provide the required radial clearance for the balls which are a working fit on two parallel portions 52 which maintain the balls in a true plane of rotation at all times. The apertures may alternatively be circular with only a clearance for the balls and the surface of the ball apertures as well as the inner spherical surface 40 of the cage may be hardened.

An articulation means for maintaining the correct position of the cage, comprises three levers 60A, 60B, 60C. Each lever is provided with segmental spherical surfaces at its central portion 63 and at its outer and inner ends 61, 62.

The outer end 61 which is of slightly larger diameter than the parts 62, 63 and forms the lever fulcrum, is held on opposite sides of a plane containing its centre by a disc 64 and plug 65, which form a bearing into which the part 61 is a sliding fit. The disc 64 and plug 65 are located in a recess in the sleeve member 10. The part 62 is located slidably in a bore 67 in the hub member 10. The part 63 slidably engages in a hole 77 in the cage 39 and the sleeve and hub members are cut away at 70, 71 (see FIG. 3) to allow for tilting movements of the lever.

It will be seen that for a given pitch circle diameter of the balls, the diameter of the inner spherical surface of the cage is slightly smaller and that of the outer spherical surface appreciably larger, so that for a given cage thickness the ball groove flanks in the sleeve and hub members are equal. The groove flanks in both the sleeve and hub members are equal and extend over an arc of 80° so that the cage thickness is approximately equal to an arc of 20° of the ball diameter.

In a modification (not shown) the three levers are replaced by a single lever the outer end of which is mounted in a plate such as 20 and the cage has arms carrying a pivot mounting between the plate 20 and the adjacent end of shaft, the inner end of the lever being pivotally mounted in the end of the shaft 12.

In the modified construction shown in FIGURE 6, the hub member is provided with a central exterior frusto-spherical surface, which surface and the cylindrical surface 44 have an axial length approximately equal to that of the ball grooves 35. The hub member carries two rings 74, 75 having exterior frusto-spherical surfaces located by and slidable on the surfaces of the locating rings 31A, 31B carried by the sleeve member. The spherical diameter of the rings 74, 75 is equal to or slightly less than that of the hub. The rings 74, 75 are fitted after applying the ball cage and have an unbroken surface in contact with the spherical surface of the rings 31A, 31B, thus precluding flow of lubricant from the ball chamber as can occur in the construction of FIGURE 1 through channels 76 formed by the cylindrical surface.

I claim:

1. A coupling comprising an outer member, an inner member within the outer member, said inner member having a frusto-spherical exterior surface, bearing means carried by the outer member and engaged by the frusto-spherical surface of the inner member, grooves provided externally on the inner member, grooves provided internally in the outer member, said grooves being parallel to the axis of rotation of said members, steel balls each located in a groove on the inner member and a groove in the outer member, a cage carried by the inner member and having aperatures therein in which the steel balls are located, a cylindrical surface formed on the exterior frusto-spherical surface of the inner member, the axis of generation of said cylindrical surface being at an angle to that of the inner member, said cage having a central spherical interior surface with adjacent interior cylindrical end surfaces whose bore is a sliding fit over said exterior cylindrical surface, whereby the cage can be slid over the exterior cylindrical surface of the hub and then rotated into the required plane of the ball centers, the said central spherical surface of the cage having a sliding fit over the spherical surface of the inner member upon which the cage can oscillate and maintain the balls in the median plane at any angle of tilt, the cage being free from contact with the outer member, and mechanical articulation means engaging the inner member and outer member to control the angular position of the cage.

2. A coupling as claimed in claim 1 wherein the articulation means comprise three levers each having a fulcrum in the outer member, its center portion in a cage aperture and an end spherical portion in a socket in the inner member.

3. A coupling as claimed in claim 1 wherein the cage has ball apertures all of uniform size and shape.

4. A coupling as claimed in claim 1 wherein the inner member is provided with a central exterior frusto-spherical surface which surface and said cylindrical surface are of axial length equal to that of the ball grooves, and with two spherical hub rings, one on each side of the grooves, of spherical diameter no greater than that of the inner member and having their frusto-spherical surfaces in contact with frusto-spherical surfaces facing each other of abutment rings carried by the outer member.

5. A coupling as claimed in claim 1 wherein frusto-spherical abutment rings carried by the inner member engage corresponding surfaces in the outer member.

6. A coupling as claimed in claim 1 wherein the articulation means comprise three levers each having a fulcrum in the outer member, its center portion in a cage aperture and an end spherical portion in a socket in the inner member, the axis of generation of the cylindrical part is at right angles to the axis of the inner member, and the cylindrical part extends over the edges of one ball groove and the diametrically opposite socket for an articulating lever.

References Cited

UNITED STATES PATENTS

| | | | |
|---|---|---|---|
| 2,309,939 | 2/1943 | Dodge | 64—7 X |
| 2,322,570 | 6/1943 | Dodge | 64—21 |
| 2,432,216 | 12/1947 | Suczek | 64—21 |
| 3,044,280 | 7/1962 | Haneklaus | 64—8 |
| 3,162,026 | 12/1964 | Ritsema | 64—21 |

FOREIGN PATENTS

| | | |
|---|---|---|
| 1,028,111 | 5/1966 | Great Britain. |

HALL C. COE, Primary Examiner